E. HUTCHINSON.
Bird-Cages.

No. 144,907.　　　　　　　　　　　　Patented Nov. 25, 1873.

Witnesses.
A. Bennekendorf.
C. Sedgwick.

Inventor.
E. Hutchinson
Per Munn & Co.
Attorneys.

UNITED STATES PATENT OFFICE.

EDWARD HUTCHINSON, OF NEW YORK, N. Y.

IMPROVEMENT IN BIRD-CAGES.

Specification forming part of Letters Patent No. 144,907, dated November 25, 1873; application filed August 16, 1873.

*To all whom it may concern:*

Be it known that I, EDWARD HUTCHINSON, of the city, county, and State of New York, have invented a new and Improved Insect-Trap Perch for Bird-Cages, of which the following is a specification:

My invention consists of a perch for bird-cages, constructed in two parts, which are tongued and grooved together so as to form a very narrow crack along each side, such as insects and vermin, which infest birds, like to hide in, and so that the two parts of the perch can be readily taken apart to destroy the insects, when the perch is removed from the cage.

Figure 1:
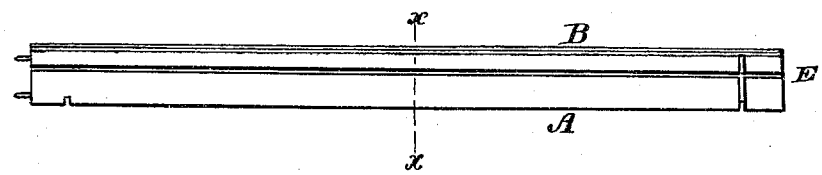
Figure 2:
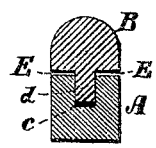

Figure 1 in the drawing is a side elevation of my improved trap-perch, and Fig. 2 is a cross-section taken on the line $x\ x$.

A and B represent the two parts of which the perch is made. One has a groove, C, extending along its upper side $c$ from end to end, and the other has a corresponding tongue, $d$, on its lower side, by which the two parts are fitted tightly together, so that they constitute one piece, and form the perch when not pulled apart. Between the two sides of said pieces so fitted together there is a small crack, E, into which the insects which go from the bird onto the perch will most naturally conceal themselves and make their nest, so that some of them may be caught and destroyed by removing the perch from the cage every day and opening it.

Having thus described my invention, I claim as new and desire to secure by Letters Patent—

A perch for bird-cages, consisting of two parts, A B, tongued and grooved together, and so united as to form cracks E for insects to conceal themselves in, substantially as specified.

EDWARD HUTCHINSON.

Witnesses:
   C. SEDGWICK,
   ALEX. F. ROBERTS.